(12) United States Patent
Taguchi et al.

(10) Patent No.: US 8,714,893 B2
(45) Date of Patent: May 6, 2014

(54) TOOL HOLDER AND METHOD FOR ASSEMBLING THE SAME

(75) Inventors: Masahiro Taguchi, Daito (JP); Eisaku Nakai, Daito (JP); Suguru Maemura, Daito (JP)

(73) Assignee: Nikken Kosakusho Works, Ltd., Daito-shi (JP)

( * ) Notice: Subject to any disclaimer, the term of this patent is extended or adjusted under 35 U.S.C. 154(b) by 1016 days.

(21) Appl. No.: 12/787,100

(22) Filed: May 25, 2010

(65) Prior Publication Data

US 2011/0129313 A1    Jun. 2, 2011

(30) Foreign Application Priority Data

Nov. 27, 2009   (JP) ................. 2009-269660

(51) Int. Cl.
*B23B 29/00* (2006.01)
(52) U.S. Cl.
USPC ........................... 409/234; 409/136; 408/143
(58) Field of Classification Search
USPC .......... 409/234, 232, 141, 136, 135; 408/143, 408/56, 279.2, 53
See application file for complete search history.

(56) References Cited

U.S. PATENT DOCUMENTS

| | | | |
|---|---|---|---|
| 3,905,609 A * | 9/1975 | Sussman | 279/20 |
| 4,499,800 A * | 2/1985 | Stahl | 82/158 |
| 4,621,960 A | 11/1986 | Toellner | |
| 5,927,913 A | 7/1999 | Mizoguchi | |
| 5,984,595 A | 11/1999 | Mizoguchi | |
| 7,938,408 B2 | 5/2011 | Haimer | |
| 2009/0033043 A1* | 2/2009 | Haimer et al. | 279/102 |

FOREIGN PATENT DOCUMENTS

| | | |
|---|---|---|
| CN | 1988975 | 6/2007 |
| JP | 59-196143 | 11/1984 |
| JP | 08-90318 | 4/1996 |
| JP | 08-150504 | 6/1996 |
| JP | 11-042506 | 2/1999 |
| JP | 11-099441 | 4/1999 |
| JP | 2004-66350 | 3/2004 |
| JP | 2008-30138 | 2/2008 |

\* cited by examiner

*Primary Examiner* — David Bryant
*Assistant Examiner* — Christopher Besler
(74) *Attorney, Agent, or Firm* — W. F. Fasse

(57) ABSTRACT

A tool holder includes a drawing screw and a stopper member. The drawing screw is positioned in an intermediate hole. A rear end face of a head of the drawing screw faces a boundary wall surface, and a top end of a shaft of the drawing screw is screwed in a rear end of a collet. The stopper member is positioned in an annular space between an outer peripheral surface of the shaft of the drawing screw and an inner peripheral surface of the intermediate hole. The stopper member faces a front end face of the head of the drawing screw, and limits movement of the head toward a top end of the tool holder. The drawing screw and the stopper member are inserted and assembled from a top end opening of a collet holding hole.

10 Claims, 1 Drawing Sheet

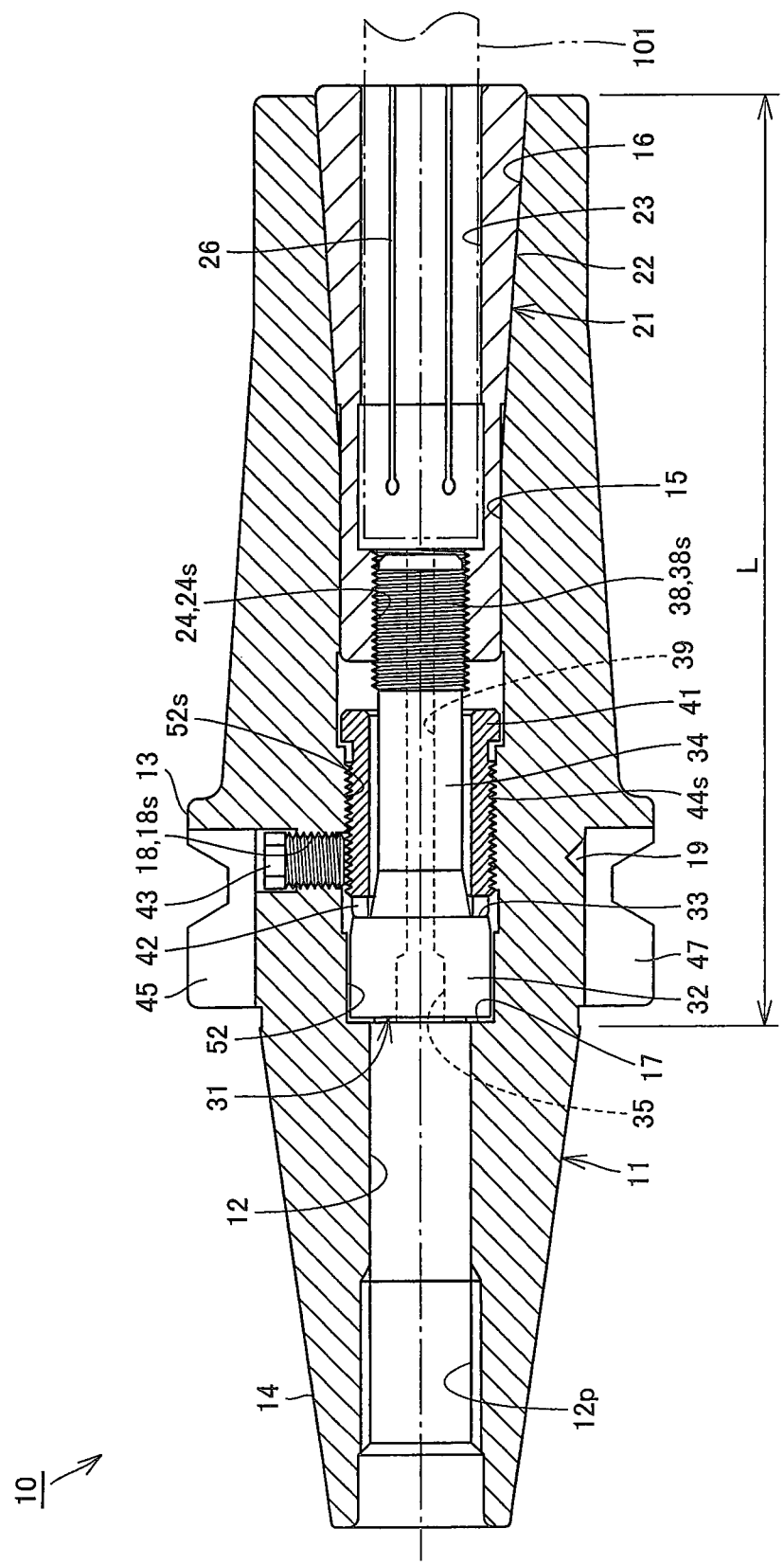

TOOL HOLDER AND METHOD FOR ASSEMBLING THE SAME

BACKGROUND OF THE INVENTION

1. Field of the Invention

The present invention relates to tool holders including a tool holder main body and a tapered collet, for chucking a shank portion of a cutting tool.

2. Description of the Background Art

The applicant of the present invention already proposed tool holders having a structure in which a drawing screw is rotatably attached to a tool holder main body, and this drawing screw draws a collet deep into a collet holding hole, in Japanese Patent Publication Nos. H08-90318 and 2008-30138 of unexamined applications.

The tool holders described in Japanese Patent Publication Nos. H08-90318 and 2008-30138 of unexamined applications include a tapered collet for inserting a shank portion of a tool therein, and a drawing screw that is screwed in the tapered collet. A wrench is inserted from a rear end opening of a pull stud attachment hole, and the drawing screw is turned in a tightening direction to draw the tapered collet deep into a collet holding hole, thereby chucking the tool inserted in a tool insertion hole of the collet.

Incidentally, when manufacturing and assembling such a conventional tool holder, a drilling process for the drawing screw is performed from the rear end of a shank portion, as in a drilling process for the pull stud attachment hole. Then, when assembling the tool holder, a slip seat, such as a washer, is inserted from a rear end opening of the pull stud attachment hole so as to adjoin an annular stepped portion, which is formed at the top end of a hole located on the top end side of the pull stud attachment hole. Thereafter, the drawing screw, which has a shaft having a smaller diameter and having external threads formed therein, and a head having a larger diameter, is inserted from the rear end opening of the pull stud attachment hole. Specifically, the drawing screw is inserted with the shaft facing the top end and the head facing the rear end, so that the head adjoins the rear end of the slip seat. At this time, the shaft extends through a central hole of the slip seat, and is screwed in the rear end of the tapered collet. Then, a stopper member is inserted from the rear end opening of the pull stud attachment hole, and is screwed on internal threads formed in the inner peripheral surface of the pull stud attachment hole. The stopper member fixed in the pull stud attachment hole faces the rear end face of the head of the drawing screw to prevent rearward movement of the drawing screw. The front end face of the head of the drawing screw is received by the top end of the hole located on the top end side of the pull stud attachment hole, via the slip seat. Thus, the drawing screw is rotatably positioned with a small sliding resistance, while limiting forward movement of the drawing screw.

However, the inventors found that there are some things that should be improved in such conventional tool holders. That is, the stopper member can be loosened and can fail to serve as a stopper member for the drawing screw.

Moreover, if the tool length of the tool holder, which is a distance from the top end of the shank portion formed along the outer periphery of the rear end of the tool holder to the top end of the tool holder, is longer than that of typical tool holders, the use of a short drawing screw requires a deep hole drilling process to form a hole from the rear end of the shank portion, which increases the processing time and the processing cost. If the same drilling process for the drawing screw is used as that used in tool holders having a short tool length, the length of the drawing screw is increased, thereby reducing rigidity of the drawing screw. Thus, the tapered collet can be drawn obliquely.

SUMMARY OF THE INVENTION

In view of the above problems, it is an object of the present invention to provide a tool holder capable of eliminating the possibility that a drawing screw moves toward a rear end of the tool holder, and capable of drawing a tapered collet straight into the tool holder.

In order to achieve the above object, a tool holder according to the present invention includes: a tool holder main body having a rear hole, an intermediate hole, a collet holding hole, and a boundary wall surface, the rear hole extending forward from a rear end of the tool holder main body along an axis, the intermediate hole connecting to a front end of the rear hole, and extending forward along the axis, the collet holding hole being a tapered hole that connects to a front end of the intermediate hole, extends to a top end of the tool holder main body along the axis, and has an inner diameter increasing toward the top end, and the boundary wall surface being located along a boundary between the rear hole and the intermediate hole, and facing forward; a tapered collet detachably inserted in the collet holding hole, having a tool insertion hole formed in a top end region, and being formed so that an outer diameter of an outer peripheral surface of the top end region increases toward the top end; a drawing screw positioned in the intermediate hole, and having a head and a screw, a rear end face of the head facing the boundary wall surface, and a top end region of the shaft being screwed in a rear end of the collet; and a stopper member positioned in an annular space between an outer peripheral surface of the shaft of the drawing screw and an inner peripheral surface of the intermediate hole, and facing a front end face of the head of the drawing screw, for limiting movement of the head toward the top end.

According to the present invention, the rear end face of the head of the drawing screw faces the boundary wall surface of the tool holder main body, movement of the head of the drawing screw toward the rear end is limited by the boundary wall surface. Thus, the drawing screw does not move toward the rear end.

According to the present invention, the drawing screw can be inserted and assembled from the collet holding hole at the top end of the tool holder, instead of being inserted and assembled from the rear hole at the rear end of the tool holder. This can reduce the respective lengths of the intermediate hole and the drawing screw, and can prevent reduction in rigidity of the drawing screw even if the tool holder main body has a long tool length, whereby the collet can be drawn straight in an axial direction.

The boundary wall surface is, e.g., an annular stepped portion that is formed at the boundary between the rear hole and the intermediate hole by making the inner diameter of the rear hole smaller than that of the intermediate hole. Alternatively, the boundary wall surface may be a protrusion that protrudes radially inward from an inner peripheral surface of the boundary.

In order to implement smooth turning of the drawing screw in a tightening direction, a rear end face of the stopper member may be surface-treated so as to reduce a friction coefficient. Preferably, the tool holder further includes a ring-shaped slip seat inserted between the front end face of the head of the drawing screw and the rear end face of the stopper member, and surface-treated so as to reduce a friction coefficient. According to this embodiment, since the ring-shaped slip seat surface-treated so as to reduce a friction coefficient is inserted between the front end face of the head of the drawing screw and the rear end face of the stopper member, the sliding resistance between the drawing screw and the stopper member can be reduced when turning the drawing screw in the tightening direction.

The stopper member for limiting movement of the head of the drawing screw toward the top end is fixed to the inner peripheral surface of the intermediate hole by screwing or the like, or by a side lock member. The side lock member may be a member for preventing the stopper member and the intermediate hole, which are screwed together, from loosening from each other, or may be a member for fixing the stopper member so that the stopper member cannot move axially. The side lock member is not limited to an embodiment. As an embodiment, a lateral through hole, which has internal threads formed in its inner peripheral surface, may be formed in the tool holder main body so as to enable an outer peripheral surface of the tool holder main body and the intermediate hole to communicate with each other, and the tool holder may further include a side lock member screwed in the lateral through hole so that a top end of the side lock member presses the stopper member. According to this embodiment, since the top end of the side lock member presses the stopper member, the stopper member can be prevented from coming off from the intermediate hole. Screwing the side lock member from the outer peripheral surface of the tool holder main body facilitates the assembling and disassembling work of the tool holder.

Preferably, a balance portion for balancing with mass of the lateral through hole and the side lock member is provided in the tool holder main body at a position opposite to the lateral through hole with respect to the axis. According to this embodiment, the center of gravity of the tool holder can be matched with the axis. This can prevent the tool holder, which rotates at a high speed about the axis, from deflecting from the axis, thereby improving the work processing accuracy. Note that the balance portion is typically a recess, but may have other shapes such as, e.g., a protrusion.

Preferably, the drawing screw and the collet are respectively provided with continuous coolant passages that allow coolant to flow therethrough. According to this embodiment, the coolant can be supplied to a cutting tool that is chucked at the top end of the tool holder.

A method for assembling a tool holder according to the present invention is a method for assembling a tool holder having a rear hole, an intermediate hole, and a collet holding hole, for drawing a collet, which is inserted through the collet holding hole, toward a rear end of the tool holder to hold the collet, the rear hole extending forward from the rear end of the tool holder, the intermediate hole connecting to a front end of the rear hole and extending forward, and the collet holding hole being a tapered hole that connects to a front end of the intermediate hole, extends to a top end of the tool holder, and has an inner diameter increasing toward the top end, the method including the following steps when manufacturing the tool holder: inserting a drawing screw, which has external threads formed in a top end region of a shaft of the drawing screw so that the top end region can be screwed into the collet, from a top end opening of the collet holding hole with a head of the drawing screw facing the rear end, and the shaft of the drawing screw facing the top end, and positioning the drawing screw in the intermediate hole; and inserting a stopper member for limiting movement of the drawing screw toward the top end, from the top end opening of the collet holding hole, and positioning the stopper member in an annular space between an outer peripheral surface of the shaft of the drawing screw and an inner peripheral surface of the intermediate hole.

According to the present invention, the drawing screw and the stopper member are inserted from the top end opening of the collet holding hole. This can reduce the respective lengths of the intermediate hole and the drawing screw as compared to conventional examples. Thus, even if the tool length of the main body of the tool holder is longer than that of typical tool holders, the overall length of the drawing screw can be reduced, and reduction in rigidity of the drawing screw can be prevented.

As described above, according to the present invention, since the boundary wall surface formed in the tool holder main body faces the rear end face of the head of the drawing screw, the drawing screw does not move toward the rear end. According to the present invention, the drawing screw and the stopper member can be inserted and assembled from the top end opening of the collet holding hole. Thus, even if the tool holder main body has a long tool length, the overall length of the drawing screw can be reduced, and reduction in rigidity can be prevented. Accordingly, the collet can be drawn straight along the axis.

BRIEF DESCRIPTION OF THE DRAWINGS

FIG. 1 is a longitudinal section of a tool holder according to an embodiment of the present invention.

DESCRIPTION OF THE PREFERRED EMBODIMENTS

An embodiment of the present invention will be described in detail below with reference to the accompanying drawing.

FIG. 1 is a longitudinal section of a tool holder according to the embodiment of the present invention. A tool holder 10 of the present embodiment is used to chuck a cutting tool, such as an end mill and a reamer, and is attached to a main shaft of a machine tool. The tool holder 10 includes a tool holder main body 11, a collet 21 attached to a top end of the tool holder main body 11, and a drawing screw 31 attached to the tool holder main body 11, for drawing the collet 21 toward a rear end of the collet 21. The tool holder 10, which is formed by assembling the tool holder main body 11, the collet 21, and the drawing screw 31 together, holds a shank portion 101 of a cutting tool.

In the tool holder main body 11, a rear hole 12, an intermediate hole 52, and a collet holding hole 15 are formed along an axis of the tool holder main body 11. The rear hole 12 extends forward from the rear end of the tool holder main body 11 along the axis of the tool holder main body 11 shown by chain line in the figure. A rear end region of the rear hole 12 forms a pull stud attachment hole 12p for attaching a pull stud, not shown, therein.

The intermediate hole 52 connects to the front end of the rear hole 12, and extends forward along the axis of the tool holder main body 11. The inner diameter of the intermediate hole 52 is larger than that of the rear hole 12, and a boundary wall surface 17 is formed along the boundary between the rear hole 12 and the intermediate hole 52. The boundary wall surface 17 forms an annular stepped portion located coaxially with the axis of the tool holder main body 11. The boundary wall surface 17 is a flat surface that is perpendicular to the axis, and faces forward.

The collet holding hole 15 connects to the front end of the intermediate hole 52, and extends along the axis to the top end of the tool holder main body 11. A top end region of the collet holding hole 15 is a tapered hole 16 whose inner diameter increases toward the top end. Thus, these holes 15, 52, 12 form a through hole that extends from the top end to the rear end of the tool holder main body 11.

A holding flange portion 13 is formed along the outer periphery of the tool holder main body 11 so as to protrude radially outward. The holding flange portion 13 is located in an axially central region, which is a region other than the top end and the rear end of the tool holder main body 11. A tapered shank portion 14 is formed in an axial rear end region that includes the rear end of the tool holder main body 11. The diameter of the tapered shank portion 14 decreases from the holding flange portion 13 toward the rear end. The tool holder 10 is attached to a main shaft of a machine tool, not shown, at the tapered shank portion 14.

A lateral through hole 18 is formed in a cut-out 45 formed in the holding flange portion 13, in the axially central portion of the tool holder main body 11. The lateral through hole 18 extends radially to enable the outer peripheral surface of the tool holder main body 11 and the rear end of the intermediate hole 52 to communicate with each other. Internal threads 18s are formed in the inner peripheral surface of the lateral through hole 18.

The cylindrical collet 21 fits in the collet holding hole 15. The outer peripheral surface of the top end region including the top end of the collet 21 is a tapered surface 22 whose outer diameter increases toward the top end. The inner periphery of the collet 21 serves as a tool insertion hole 23 and a drawing hole 24. The tool insertion hole 23 extends from the top end of the collet 21 toward the axial rear end thereof, and connects to the drawing hole 24 formed in the rear end of the collet 21. That is, the tool insertion hole 23 and the drawing hole 24 form a through hole axially extending through the collet 21. The shank portion 101 of the cutting tool is inserted into the tool insertion hole 23 from the top end of the tool insertion hole 23. Thus, the axial top end side is hereinafter sometimes referred to as the "tool insertion side." Internal threads 24s are formed in the inner peripheral surface of the drawing hole 24.

The collet 21 has a plurality of slit-like slots 26 that extend parallel to the axis. The slots 26 extend from the end on the tool insertion side of the collet 21 to the axially central region, and are positioned at regular intervals in a circumferential direction. The diameter of the collet 21 can be changed by compressing the slots 26.

The drawing screw 31 is shaped like a bolt, and is positioned in the intermediate hole 52. The drawing screw 31 extends along the axis of the tool holder main body 11 with a head 32 of the drawing screw 31 facing axially rearward, and a shaft of the drawing screw 31 facing axially forward. External threads 38s are formed in a top end 38 of the shaft. The outer diameter of the head 32 is larger than that of an axially central region 34 of the drawing screw 31. Thus, a front end face 33 is formed in the head 32. The front end face 33 forms an annular stepped portion. The top end 38 of the drawing screw 31 is screwed in the drawing hole 24 in the rear end of the collet 21. Note that the external threads 38s and the internal threads 24s are right-hand threads. A rear end face of the head 32 faces the boundary wall surface 17 of the tool holder main body 11, and the boundary wall surface 17 limits movement of the head 32 toward the rear end.

A stopper member 41 is positioned in an annular space between the outer peripheral surface of the central region 34, which is a region of the shaft of the drawing screw 31 located between the head 32 and the top end 38, and the inner peripheral surface of the intermediate hole 52. The stopper member 41 has a cylindrical shape, and the drawing screw 31 extends through a central hole of the stopper member 41. External threads 44s are formed in the outer peripheral surface of the stopper member 41. Internal threads 52s are formed in the internal peripheral surface of the intermediate hole 52 so as to mate with the external threads 44s. The stopper member 41 is screwed in the intermediate hole 52. The stopper member 41 is attached to the tool holder main body 11 in this manner. Note that the external threads 44s and the internal threads 52s are left-handed threads.

A ring-shaped slip seat 42 is inserted between the front end face 33 of the head 32 of the drawing screw 31, and a rear end face of the stopper member 41. Both end faces of the slip seat 42, which are a rear end face and a top end face of the slip seat 42, have been subjected to a friction reducing treatment for reducing the frictional resistance with the front end face 33 and the stopper member 41, respectively. Examples of such a treatment include an ion nitriding treatment, a diamond like carbon (DLC) coating treatment, a titanium nitride (TiN) coating treatment, and a mirror lapping treatment. Both end faces of the slip seat 42 may have been subjected to oil-film lubrication solely or together with the above treatment.

Thus, the stopper member 41 faces the front end face 33 of the head 32 with the slip seat 42 interposed therebetween, and limits movement of the head 32 toward the top end. The drawing screw 31 and the stopper member 41 are positioned in the intermediate hole 52. A hexagon socket 35 for receiving a wrench is formed in the middle of the rear end face of the head 32. The wrench, not shown, is inserted from a rear end opening of the rear hole 12. When the drawing screw 31 is turned with the wrench in a tightening direction, the drawing screw 31 draws the collet 21 toward the rear end. On the other hand, when the drawing screw 31 is turned with the wrench in a loosening direction, the drawing screw 31 moves the collet 21 toward the top end.

A bolt-shaped side lock member 43 is screwed in the lateral through hole 18 of the tool holder main body 11. A hexagon socket for receiving a wrench, not shown, is formed in an end of the side lock member 43, which is located on the outer diameter side of the tool holder main body 11. In other words, the hexagon socket is formed in the middle of a head of the side lock member 43. External screws are formed in the outer peripheral surface of a shaft of the side lock member 43. Thus, the side lock member 43 is screwed from the outer peripheral surface of the main holder main body 11 so as to be tightened or loosened. When the side lock member 43 is turned in a tightening direction, the top end of the side lock member 43 enters the tool holder main body 11 radially inward to press the stopper member 41. Thus, the side lock member 43 prevents the stopper member 41 and the intermediate hole 52, which are screwed together, from being loosened from each other. In this manner, the stopper member 41 is attached in an axially immovable manner.

A recess 19 is formed in the tool holder main body 11 at a position located opposite to the lateral through hole 18 with respect to the axis. The recess 19 is formed on the inner diameter side of a cut-out 47 that is located symmetrically to the cut-out 45 with respect to the axis. The recess 19 is axially located at the same position as that of the lateral through hole 18, and is circumferentially displaced by 180 degrees from the lateral through hole 18 about the axis. The recess 19 is recessed from the outer peripheral surface of the tool holder main body 11, and balances with the mass of the lateral through hole 18 and the side lock member 43 in the state in which the side lock member 43 is attached to the lateral through hole 18 of the tool holder main body 11.

The recess 19 serving as a balance portion for balancing the mass will be described in detail. If only the lateral through hole 18 is provided, the center of gravity of the tool holder main body 11 does not match with the axis. Moreover, the side lock member 43 can be made of a material different from that of the tool holder main body 11. Thus, the center of gravity of the tool holder main body 11 does not match with the axis even if the side lock member 43 is attached to the lateral through hole 18. In the present embodiment, the center of gravity of the tool holder 10 matches with the axis, since the recess 19 is provided in the tool holder main body 11 at a position located opposite to the lateral though hole 18 with respect to the axis.

Procedures for assembling the tool holder 10 will be described below.

First, with the head 32 of the drawing screw 31 facing the rear end, the drawing screw 31 is inserted from a top end opening of the collet holding hole 15 until the head 32 faces the boundary wall surface 17 formed along the boundary between the intermediate hole 52 and the rear hole 12. Note that the drawing screw 31 has the external threads 38s that are formed in the top end 38 of the shaft so as to screw in the collet 21, and the outer diameter of the head 32 is larger than that of the central region 34 of the shaft. Since the outer diameter of the head 32 is larger than the inner diameter of the rear hole 12, the head 32 does not move rearward through the rear hole 12.

Then, the stopper member 41 for limiting movement of the front end face 33 of the head 32 toward the top end is inserted from the top end opening of the collet holding hole 15, and is positioned in the annular space between the outer peripheral surface of the central region 34 of the drawing screw 31 and the inner peripheral surface of the intermediate hole 52. More specifically, the stopper member 41 is turned to the left in a tightening direction, whereby the stopper member 41 is attached to the intermediate hole 52. Note that the drawing screw 31 may be inserted through the stopper member 41 and the slip seat 42 in advance, so that the stopper member 41 and the drawing screw 31 can be simultaneously inserted from the top end opening of the collet holding hole 15.

Then, the side lock member 43 is screwed from the outer peripheral surface of the tool holder main body 11 into the lateral through hole 18 that allows the outer peripheral surface of the tool holder main body 11 and the intermediate hole 52 to communicate with each other. At this time, the side lock member 43 is screwed into the lateral through hole 18 so that the top end of the side lock member 43 presses the stopper member 41. This prevents the stopper member 41 from being turned in a loosening direction, whereby the stopper member 41 can be made immovable in an axial direction.

According to the tool holder 10 of the present embodiment, the drawing screw 31 and the stopper member 41 are inserted and assembled from the top end opening of the collet holding hole 15. This can reduce the respective lengths of the intermediate hole 52 and the drawing screw 31 as compared to conventional examples. Thus, the rigidity of the drawing screw 31 can be increased, and the collet 21 can be drawn straight, as compared to drawing screws, which have a long overall length and are inserted and assembled from a rear end opening of a rear hole as in conventional tool holders. The present embodiment has an advantageous effect especially in the tool holder main body 11 having a longer tool length L than that of typical tool holder main bodies. Note that the tool length L refers to a length from the top end of the shank portion 14 to the top end of the tool holder main body 11.

According to the present embodiment, the side lock member 43 is screwed from the outer peripheral surface of the tool holder main body 11. This facilitates the assembling and disassembling work of the tool holder main body 11.

Procedures for chucking the shank portion 101 of the cutting tool will be described below.

First, the tool holder main body 11, the drawing screw 31, the stopper member 41, the slip seat 42, and the side lock member 43 are assembled. Then, the drawing hole 24 in the rear end of the collet 21 is loosely screwed on the top end 38 of the drawing screw 31, and the shank portion 101 of the cutting tool is inserted into the tool insertion hole 23 of the collet 21. In this state, since the collet 21 has not been drawn toward the rear end, the inner diameter of the tool insertion hole 23 has not been reduced.

Then, a wrench is inserted into the hexagon socket 35 to turn the drawing screw 31 in the tightening direction. Thus, the collet 21 is drawn toward the rear end. At this time, the tapered surface 22 of the collet 21 is pressed into the tapered hole 16 of the tool holder main body 11. Thus, the slits 26 are compressed, and the inner diameter of the tool insertion hole 23 is reduced, whereby the tool holder 10 chucks the shank portion 101 of the cutting tool.

The shank portion 101 can be de-chucked by reverse procedures.

According to the tool holder 10 of the present embodiment, the boundary wall surface 17 formed in the tool holder main body 11 limits movement of the rear end of the drawing screw 31 toward the rear end. Thus, the drawing screw 31 does not move toward the rear end.

The tool holder 10 of the present embodiment enables the drawing screw 31 to be inserted and assembled from the collet holding hole 15 located at the top end of the tool holder 10, instead of inserting and assembling the drawing screw 31 from the pull stud attachment hole 12p located at the rear end of the tool holder 10. This can reduce the length of the intermediate hole 52, and can prevent reduction in rigidity in the tool length L of the tool holder main body 11. Moreover, this can reduce the overall length of the drawing screw 31, and can prevent reduction in rigidity of the drawing screw 31.

The ring-shaped slip seat 42, which has been subjected to a surface treatment for reducing a friction coefficient, is inserted between the head 32 of the drawing screw 31 and the stopper member 41. Thus, the slip seat 42 can reduce the sliding resistance between the head 32 of the drawing screw 31 and the stopper member 41 when turning the drawing screw 31 in the tightening direction.

Since the side lock member 43 is screwed into the lateral through hole 18 from the outer peripheral surface of the tool holder main body 11, the assembling and disassembling work of the tool holder 10 is facilitated.

The recess 19 as a balance portion for balancing with the mass of the side lock member 43 is provided in the tool holder main body 11 at a position opposite to the lateral through hole 18 with respect to the axis. Thus, the center of gravity of the tool holder 10 can be matched with the axis. This can prevent the tool holder 10, which rotates at a high speed about the axis, from deflecting from the axis, thereby improving the work processing accuracy.

In the present embodiment, coolant can be supplied to the shank portion 101. A flow passage for the coolant will be described below.

The rear hole 12 extending axially forward from the rear end of the tool holder main body 11, and the intermediate hole 52 connecting to the front end of the rear hole 12 and extending toward the top end, for positioning the drawing screw 31 therein, serve as a first passage for supplying the coolant to the drawing screw 31.

The drawing hole 24 extending from the rear end of the collet 21 toward the top end, and the tool insertion hole 23 connecting to the front end of the drawing hole 24 and extending to the top end, for inserting the shank portion 101 therein, serves as a third passage for supplying the coolant to the shank portion 101.

The drawing screw 31 has a second passage 39 axially extending from the top end to the rear end of the drawing screw 31. The second passage 39 of the drawing screw 31 connects to the rear hole 12 (the first passage) and the drawing hole 24 (the third passage). Thus, the first passage, the second passage 39, and the third passage form continuous coolant passages that allow the coolant to flow therethrough, respectively. The coolant can thus be supplied from the rear end of the tool holder 10 sequentially through the continuous first, second, and third passages to the shank portion 101 of the cutting tool.

Although the embodiment of the present invention has been described with reference to the drawing, the present invention is not limited to the illustrated embodiment. Various modifications and variations can be made to the illustrated embodiment within a scope that is the same as, or equivalent to the present invention.

The tool holder of the present invention is advantageously used in machine tools.

What is claimed is:

1. A tool holder, comprising:
   a tool holder main body having a rear hole, an intermediate hole, a collet holding hole, and a boundary wall surface, said rear hole extending forward from a rear end of said tool holder main body along an axis, said intermediate hole having an inner diameter larger than an inner diameter of said rear hole, connecting to a forward end of said rear hole and extending forward along said axis, wherein said collet holding hole comprises a tapered hole and connects to a forward end of said intermediate hole, extends to a front end of said tool holder main body along said axis, and has an inner diameter increasing toward said front end, and wherein said boundary wall surface is a flat annular boundary wall surface on a radial plane located along a boundary between said rear hole and said intermediate hole and faces forward toward said front end;
   a tapered collet detachably inserted in said collet holding hole, having a tool insertion hole formed in a front end region of said collet, having a tapered outer wall that is slotted with slots, and being formed so that an outer diameter of an outer peripheral surface of said front end region increases toward said front end;
   a drawing screw positioned in said intermediate hole, and having a head and a screw shaft, said head having an outer diameter larger than said inner diameter of said rear hole, a rear end face of said head facing said boundary wall surface, said screw shaft having an outer diameter smaller than said outer diameter of said head, said drawing screw being inserted into said intermediate hole through said collet holding hole before insertion of said tapered collet, and a front end region of said screw shaft being screwed in a rear end of said collet, wherein said flat annular boundary wall surface is positioned and configured to contactingly receive said rear end face of said head of said drawing screw so as to limit movement of said drawing screw toward said rear end; and
   a stopper member positioned in an annular space between an outer peripheral surface of said screw shaft of said drawing screw and an inner peripheral surface of said intermediate hole, and facing a front end face of said head of said drawing screw, for limiting movement of said head toward said front end;
   wherein said drawing screw, said stopper member, said tapered collet and said tapered hole are arranged, configured and cooperate with one another so that when said drawing screw is screwed into said collet, said drawing screw moves tightly against said stopper member and then said drawing screw draws said tapered collet farther into said tapered hole toward said rear end whereby said tapered hole squeezes said tapered collet so that said slots are squeezed and an inner diameter of said tool insertion hole shrinks radially inwardly.

2. The tool holder according to claim 1, further comprising:
   a ring-shaped slip seat inserted between said front end face of said head of said drawing screw and a rear end face of said stopper member, and surface-treated so as to reduce a friction coefficient.

3. The tool holder according to claim 1, wherein
   a lateral through hole, which has internal threads formed in its inner peripheral surface, is formed in said tool holder main body so as to enable an outer peripheral surface of said tool holder main body and said intermediate hole to communicate with each other, said tool holder further comprising:
   a side lock member screwed in said lateral through hole so that a radially inner end of said side lock member presses said stopper member.

4. The tool holder according to claim 3, wherein
   a balance portion for balancing with mass of said lateral through hole and said side lock member is provided in said tool holder main body at a position opposite to said lateral through hole with respect to said axis.

5. The tool holder according to claim 1, wherein
   said drawing screw and said collet are respectively provided with continuous coolant passages that allow coolant to flow therethrough.

6. A method for assembling a tool holder having a rear hole, an intermediate hole, and a collet holding hole, for drawing a collet, which is inserted through said collet holding hole, toward a rear end of said tool holder to hold said collet, said rear hole extending forward from said rear end of said tool holder, said intermediate hole having an inner diameter larger than an inner diameter of said rear hole, connecting to a forward end of said rear hole and extending forward, a flat annular boundary wall being formed along a radial plane between said rear hole and said intermediate hole, wherein said collet holding hole comprises a tapered hole, connects to a forward end of said intermediate hole, extends to a front end of said tool holder, and has an inner diameter increasing toward said front end, a front end region of said collet has a tapered surface slotted with slots, said method comprising the following steps when manufacturing said tool holder:
   inserting a drawing screw, which has external threads formed in a front end region of a screw shaft of said drawing screw so that said front end region can be screwed into said collet, from a front end opening of said collet holding hole with a head of said drawing screw facing said rear end and said screw shaft of said drawing screw facing said front end, and positioning said drawing screw in said intermediate hole, wherein said head has an outer diameter larger than said inner diameter of said rear hole and larger than an outer diameter of said screw shaft; and
   inserting a stopper member for limiting movement of said drawing screw toward said front end, from said front end opening of said collet holding hole, and positioning said stopper member in an annular space between an outer peripheral surface of said screw shaft of said drawing screw and an inner peripheral surface of said intermediate hole, wherein said flat annular boundary wall limits movement of said head of said drawing screw toward said rear end.

7. The tool holder according to claim 1, wherein said tapered outer wall of said tapered collet is located radially outwardly around said tool insertion hole in said front end region.

8. The tool holder according to claim 7, wherein said tapered outer wall continues to a front end of said tapered collet.

9. The tool holder according to claim 1, wherein said stopper has an external threading that is threaded into an internal threading in said inner peripheral surface of said intermediate hole, and said external threading of said stopper has an opposite thread-handing direction compared to a threading of said screw shaft of said drawing screw.

10. A tool holder comprising:
- a tool holder body having a continuous hole extending axially therethrough from a rear end to a front end of said tool holder body, wherein said hole includes a rear hole portion having a relatively smaller inner diameter, an intermediate hole portion having a relatively larger inner diameter, a flat annular boundary wall being formed along a radial plane between said rear hole portion and said intermediate hole portion, and a tapering front hole portion having a tapering inner diameter that tapers in a direction from said front end toward said rear end;
- a stopper member having a central hole extending axially therethrough, and having an external threading that is thread-engaged in an internal threading in said intermediate hole portion;
- a screw having a screw head with a relatively larger outer diameter and a screw shaft with a relatively smaller outer diameter, arranged with said screw head captured in said intermediate hole portion between said stopper member and said rear hole portion, and with said screw shaft extending through said central hole of said stopper member toward said front end; and
- a tool-holding collet having a head portion and a tapered portion, wherein said head portion has an internally threaded hole that is thread-engaged on an externally threaded end of said screw shaft, and wherein said tapered portion has a tool-receiving hole extending axially therein from a front end of said collet, a tapered outer wall that has a tapered outer diameter which tapers narrower from said front end of said collet and that is fittingly received in said tapering front hole portion, and longitudinally extending slots that pass through said tapered outer wall into said tool-receiving hole;
- wherein said screw, said stopper member, said collet and said tapering front hole portion are arranged, configured and cooperate with one another so that when said threaded end of said screw shaft is screwed into said internally threaded hole of said collet, then said screw head bears against said stopper member and said screw draws said collet farther into said tapering front hole portion whereby said tapering front hole portion squeezes said tapered portion of said collet whereby said slots are squeezed and an inner diameter of said tool-receiving hole shrinks radially inwardly.

* * * * *